United States Patent [19]

Campbell

[11] 3,843,611
[45] Oct. 22, 1974

[54] COPOLYAMIDE FROM TEREPHTHALIC ACID, DODECANEDIOIC ACID AND DODECANE DIAMINE

[75] Inventor: Robert W. Campbell, Bartlesville, Okla.

[73] Assignee: Phillips Petroleum Company, Bartlesville, Okla.

[22] Filed: May 22, 1972

[21] Appl. No.: 255,868

[52] U.S. Cl. ...... 260/78 R, 260/78 S, 260/857 TW, 260/31.2 N
[51] Int. Cl. .......................................... C08g 20/20
[58] Field of Search ................ 260/78 R, 857 TW

[56] References Cited
UNITED STATES PATENTS

| 3,216,965 | 11/1965 | Cipriani | 260/857 TW |
| 3,475,387 | 10/1969 | Carter et al. | 260/78 R |
| 3,647,761 | 3/1972 | Ridgeway et al. | 260/78 R |
| 3,696,074 | 10/1972 | Tsuda et al. | 260/78 R |

OTHER PUBLICATIONS

Yu et al., Journal of Polymer Science, Vol. 42, (1960), pp. 249–257.

Primary Examiner—Harold D. Anderson

[57] ABSTRACT

An improved copolyamide is derived from terephthalic acid, at least one straight-chain alkanedioic acid having from 8 to 14 carbon atoms, the terephthalic acid constituting from 50 to about 90 mole percent of the acids, and at least one straight-chain alpha, omega-alkanediamine having from 6 to 14 carbon atoms. This copolyamide is useful as a molding resin and in the production of fibers.

8 Claims, No Drawings

COPOLYAMIDE FROM TEREPHTHALIC ACID, DODECANEDIOIC ACID AND DODECANE DIAMINE

This invention relates to an improved copolyterephthalamide.

In accordance with this invention, copolyamides having an especially good balance of properties are prepared by the copolymerization of terephthalic acid, at least one straight-chain alkanedioic acid, and at least one straight-chain alpha,omega-alkanediamine, each as such or as a preformed salt with at least one of the other monomers. These copolyamides have properties which make them superior to both the homopolyamide from terephthalic acid and the alkanediamine and the homopolyamide from the alkanedioic acid and the alkanediamine. Thus, when compared with homopolyamides from terephthalic acid and alkanediamines, the copolyamides of this invention have better flow properties, are considerably whiter, have lower polymer-melt temperatures and lower crystalline melting points that permit lower fabrication temperatures, and have greater strength and toughness. When compared with homopolyamides from alkanedioic acids and alkanediamines, the copolyamides of this invention possess greater strength and stiffness.

Although it is not desired that this invention be restricted by any particular theory, it is presently believed that the especially desirable combination of properties exhibited by the copolyamides of this invention results in part from the surprising finding that these copolymers contain block structures, i.e., structures in which recurring units derived from the alkanediamine and terephthalic acid are segregated from, not randomly mixed with, recurring units derived from the alkanediamine and the alkanedioic acid. Evidence for this block character of the copolyamides of this invention is provided by the observation that the copolymers possess a high degree of crystallinity throughout the range of terephthalic acid to alkanedioic acid ratios used in their preparation, and particularly by the finding of two crystalline melting endotherms in the differential thermal analysis trace of the copolymers.

The copolyamides of this invention are especially useful as molding resins and in the production of fibers.

Accordingly, it is an object of the present invention to provide a new and improved copolyterephthalamide. It is an object of the invention to produce a copolyterephthalamide having an improved overall balance of properties. Yet another object of the invention is to provide a copolyterephthalamide having high values for tensile strength and Izod impact. Other objects, aspects, and advantages of the invention will be apparent from a study of the specification and the appended claims to the invention.

Straight-chain alkanedioic acids applicable in the production of the copolyamides of this invention can be represented by the formula $HO_2C(CH_2)_xCO_2H$, wherein $x$ is an integer of about 6 to 12. Suitable alkanedioic acids include suberic acid, azelaic acid, decanedioic acid, undecanedioic acid, dodecanedioic acid, tridecanedioic acid, tetradecanedioic acid, and mixtures thereof. Dodecanedioic acid is the presently preferred alkanedioic acid.

Straight-chain alpha,omega-alkanediamines which can be used in the production of the copolyamides of this invention can be represented by the formula $H_2N(CH_2)_yNH_2$, wherein $y$ is an integer of 6 to 14. Applicable alkanediamines include 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, and mixtures thereof. 1,12-Dodecanediamine is the presently preferred alkanediamine.

In the polymerization process, the molar ratio of the dicarboxylic acids to the diamine should be substantially 1:1, although a slight excess of any of the monomer components, e.g., up to about 5 mole percent of dicarboxylic acids or up to about 1 mole percent of diamine, can be used. The terephthalic acid can constitute about 50 to about 90 mole percent, preferably about 60 to about 85 mole percent, of the total amount of dicarboxylic acids employed.

The copolyamides of this invention can be prepared by heating the mixture of monomers and/or salts thereof at about 250° to about 350°C., preferably about 300° to about 340°C., for about 1 hour to about 16 hours, preferably about 1.5 hours to 8 hours. The pressure normally reaches a maximum of not more than about 1,000 psig, preferably not more than about 600 psig, and is allowed to diminish by venting gaseous material, sometimes with the aid of an inert gas, the final heating being conducted at a pressure as low as about 1 mm Hg, preferably in the range of about 10 to about 50 mm Hg. If desired, the mixtures of monomers and/or salts can be heated at a lower temperature, e.g., about 200° to about 230°C., for a period of time, e.g., about ½ hour to about 6 hours, prior to the heating at about 250° to about 350°C. Water can be present to serve as a heat transfer agent and to aid in keeping the reactants in the reaction zone. Acetic acid can be present, preferably in the range of about ¼ to about 3 mole percent based on the total diacid, to control and stabilize the molecular weight of the polyamide.

COMPARATIVE EXAMPLE A

To a 1-liter autoclave were charged 200 grams (0.548 mole) of the salt (pH 7.3) of 1,12-dodecanediamine and terephthalic acid, 2.72 grams (0.0164 mole) of terephthalic acid, and 45 grams of deionized water. Air was removed, and the system was placed under 60 psig nitrogen and heated in the following manner:

| Time, minutes | Temperature, °C. | Comments |
| --- | --- | --- |
| 30 | ~25–210 | heated at an at least substantially uniform rate. |
| 180 | 210 | temperature maintained at least substantially constant. |
| 60 | 210–320 | heated at an at least substantially uniform rate. |
| 30 | 320 | temperature maintained at least substantially constant. |
| 30 | 320 | vented slowly to atmospheric pressure. |
| 30 | 320 | nitrogen flush. |
| 15 | 320 | pressure reduced slowly to 20 mm Hg. |
| 30 | 320 | 20 mm Hg pressure. |

The pressure reached the range of 500 to 600 psig and was maintained in that range during the first 5 hours by venting as necessary.

This polymer, hereinafter designated as Homopolyamide A, had a polymer-melt temperature of 295°C., an inherent viscosity of 0.82, determined at 30°C. in a dichloroacetic acid solution having a polymer concentration of 0.5 gram per 100 milliliters solution, and a $T_m$ of 296°C. The determinations of inherent viscosity, crystalline melting point ($T_m$), and polymer-melt temperature (PMT) are described in pages 41–50 of Sorenson and Campbell, "Preparative Methods of Polymer Chemistry," Interscience Publishers, Inc., New York (1961). As obtained in this and subsequent Examples, $T_m$ was determined by differential thermal analysis of samples using a heating rate of 10°C. per minute in an inert atmosphere, and PMT was determined by placing samples on a heated bar with a temperature gradient.

COMPARATIVE EXAMPLE B

To a 1-liter autoclave were charged 100.20 grams (0.500 mole) of 1,12-dodecanediamine, 115.15 grams (0.500 mole) of dodecanedioic acid, and 45 grams of deionized water. Air was removed, and the system was placed under 60 psig nitrogen and heated in the following manner:

| Time, minutes | Temperature, °C. | Comments |
|---|---|---|
| 60 | ~25–210 | heated at an at least substantially uniform rate. |
| 60 | 210 | temperature maintained at least substantially constant. |
| 60 | 210–300 | heated at an at least substantially uniform rate. |
| 30 | 300 | temperature maintained at least substantially constant. |
| 30 | 300 | vented slowly to atmospheric pressure. |
| 30 | 300 | nitrogen flush. |
| 15 | 300 | pressure reduced slowly to 20 mm Hg. |
| 45 | 300 | 20 mm Hg. |

The pressure reached the range of 500 to 600 psig and was maintained in this range during the first 3½ hours by venting as necessary.

This polymer, hereinafter designated as Homopolyamide B, had a polymer-melt temperature of 235°C., an inherent viscosity of 1.71, determined at 30°C. in a m-cresol solution having a polymer concentration of 0.5 gram per 100 milliliters solution, and a $T_m$ of 184°C.

EXAMPLE I

A copolyamide of this invention was prepared in the following manner. To an unstirred 1-liter autoclave were charged 161.79 grams (0.4414 mole) of the salt (pH 7.2) of 1,12-dodecanediamine and terephthalic acid, 25.4 grams (0.1104 mole) of dodecanedioic acid, 22.12 grams (0.1104 mole) of 1,12-dodecanediamine, 0.33 gram (0.0055 mole) of acetic acid, and 45 grams of deionized water. The mixture was then heated in the following manner under a nitrogen atmosphere at an initial pressure of 60 psig.

| Time, minutes | Temperature, °C. | Comments |
|---|---|---|
| 30 | ~25–210 | heated at an at least substantially uniform rate. |
| 150 | 210 | temperature maintained at least substantially constant. |
| 60 | 210–320 | heated at an at least substantially uniform rate. |
| 30 | 320 | temperature maintained at least substantially constant. |
| 30 | 320 | vented slowly to atmospheric pressure. |
| 30 | 320 | slow nitrogen flush. |
| 15 | 320 | pressure reduced slowly to 20 mm Hg. |
| 30 | 320 | 20 mm Hg. |

The pressure reached the range of 500 to 600 psig and was maintained in this range during the first 4½ hours by venting as necessary.

The resulting copolyamide, herein designated as Copolyamide I, had a crystalline melting point of 285°C., a polymer-melt temperature of 280°C., and an inherent viscosity of 0.74, determined at 30°C. in a dichloroacetic acid solution having a polymer concentration of 0.5 gram per 100 milliliters solution.

EXAMPLE II

Another copolyamide of this invention was prepared in the following manner. To an unstirred 1-liter autoclave were charged 145.70 grams (0.3975 mole) of the salt (pH 7.4) of 1,12-dodecanediamine and terephthalic acid, 61.05 grams (0.2651 mole) of dodecanedioic acid, 53.13 grams (0.2651 mole) of 1,12-dodecanediamine, 0.40 gram (0.0066 mole) of acetic acid, and 45 grams of deionized water. The mixture was then heated in the following manner under a nitrogen atmosphere at an initial pressure of 60 psig.

| Time, minutes | Temperature, °C. | Comments |
|---|---|---|
| 60 | ~25–210 | heated at an at least substantially uniform rate. |
| 60 | 210 | temperature maintained at least substantially constant. |
| 60 | 210–320 | heated at an at least substantially uniform rate. |

—Continued

| Time, minutes | Temperature, °C. | Comments |
|---|---|---|
| 60 | 320 | temperature maintained at least substantially constant. |
| 30 | 320 | vented slowly to atmospheric pressure. |
| 30 | 320 | nitrogen flush. |
| 15 | 320 | pressure reduced slowly to 20 mm Hg. |
| 45 | 320 | 20 mm Hg. |

The pressure reached the range of 500 to 600 psig and was maintained in this range during the first 4 hours by venting as necessary.

The resulting copolyamide, herein designated as Copolyamide II, had a crystalline melting point of 244°C., a polymer-melt temperature of 250°C., and an inherent viscosity of 0.76, determined in dichloroacetic acid as described above.

The above Copolyamides I and II and Homopolyamides A and B were compression molded, and mechanical properties of the molded specimens were determined as shown in Table I. Copolyamides I and II are polyamides within the scope of this invention. Homopolyamides A and B are polyamides outside the scope of this invention.

As shown in Table I, the tensile strength of each of Copolyamides I and II was far superior to that of either of the homopolyamides. Furthermore, Copolyamides I presently preferred copolyamides also are white in color.

EXAMPLE III

To an unstirred 1-liter autoclave were charged 143.11 grams (0.3906 mole) of the salt (pH 6.5) of 1,12-dodecanediamine and terephthalic acid, 25.84 grams (0.1122 mole) of dodecanedioic acid, 19.56 grams (0.0976 mole) of 1,12-dodecanediamine, and 45 grams of deionized water. The mixture was then heated in the following manner under a nitrogen atmosphere at an initial pressure of 60 psig.

The pressure reached the range of 500 to 600 psig and was maintained in this range during the first 3½ hours by venting as necessary.

The resulting copolyamide had a crystalline melting point of 267°C., a polymer-melt temperature of 270°C.,

TABLE I

|  | Copolyamide | | Homopolyamide | |
|---|---|---|---|---|
|  | I | II | A | B |
| Tensile strength[1], psi | 10590 | 8570 | 5590 | 5970 |
| Elongation[1], % | 64 | 57 | 7 | 78 |
| Flexural modulus[2], psi × 10$^{-3}$ | 327 | 327 | 410 | 176 |
| Izod impact strength[3], ft-lb/in notch | 0.9 | 0.7 | 0.2 | 1.2 |
| Color | White | White | Cream | White |

[1] ASTM D 638–68.
[2] ASTM D 790–66.
[3] ASTM D 256–56.

| Time, minutes | Temperature, °C. | Comments |
|---|---|---|
| 60 | ~25–210 | heated at an at least substantially uniform rate. |
| 60 | 210–280 | heated at an at least substantially uniform rate. |
| 30 | 280–320 | heated at an at least substantially uniform rate. |
| 60 | 320 | temperature maintained at least substantially constant. |
| 30 | 320 | vented slowly to atmospheric pressure. |
| 30 | 320 | nitrogen flush. |
| 15 | 320 | pressure reduced slowly to 30 mm Hg. |
| 30 | 320 | 30 mm Hg. | and II, and particularly Copolyamide I, exhibited a better overall balance of properties than did the homopolyamides. In general, the copolyamides of the present invention have a tensile strength of at least 7,000 psi, preferably at least 7,500 psi, a percent elongation of at least 40, preferably at least 50, a flexural modulus of at least 250,000 psi, preferably at least 300,000 psi, an Izod impact strength of at least 0.5 ft-lb/in notch, preferably at least 0.6 ft-lb/in notch. The an inherent viscosity of 0.64, determined in dichloroacetic acid as in Example I, and a white color.

The above copolyamide was melt spun and drawn, giving filaments with the following properties:

| | | |
|---|---|---|
| Tenacity[1] | 4.3 | gpd |
| Elongation[1] | 10 | % |
| Initial modulus[1] | 59 | gpd |
| Boiling water shrinkage[2] | 7 | % |

[1] ASTM D 2256–69.
[2] ASTM D 2102–64.

| Time, minutes | Temperature, °C. | Comments |
| --- | --- | --- |
| 60 | 120–210 | heated at an at least substantially uniform rate. |
| 60 | 210–280 | heated at an at least substantially uniform rate. |
| 30 | 280–320 | heated at an at least substantially uniform rate. |
| 360 | 320 | nitrogen flush. |

EXAMPLE IV

To an unstirred glass reactor were charged 4.3980 grams (12 millimoles) of the salt (pH 6.9) of 1,12-dodecanediamine and terephthalic acid, 1.8420 grams (8 millimoles) of dodecanedioic acid, and 1.6039 grams (8 millimoles) of 1,12-dodecanediamine. The mixture was then heated in the following manner under a nitrogen atmosphere.

| Time, minutes | Temperature, °C. | Comments |
| --- | --- | --- |
| 60 | 120–210 | heated at an at least substantially uniform rate. |
| 60 | 210 | temperature maintained at least substantially constant. |
| 60 | 210–280 | heated at an at least substantially uniform rate. |
| 30 | 280–320 | heated at an at least substantially uniform rate. |
| 60 | 320 | temperature maintained at least substantially constant. |
| 60 | 320 | nitrogen flush. |
| 60 | 320 | 30 mm Hg. |

The pressure reached the range of 15 to 20 psig and was maintained in this range during the first 4½ hours by venting as necessary.

The cream colored copolyamide thus produced has a polymer-melt temperature of 240°C. and an inherent viscosity of 0.41, determined in dichloroacetic acid as in Example I. The copolyamide exhibited the normal melting endotherm at its crystalline melting point of 254°C. and an additional crystalline melting endotherm at 183°C. which could be quenched out and redeveloped by annealing, indicating the polymer to have a block structure.

EXAMPLE V

To an unstirred glass reactor were charged 4.3986 grams (12 millimoles) of the salt (pH 7.0) of 1,12-dodecanediamine and terephthalic acid, 2.0721 grams (9 millimoles) of dodecanedioic acid, and 1.6030 grams (8 millimoles) of 1,12-dodecanediamine. The mixture was then heated in the following manner under a nitrogen atmosphere at an initial pressure of 10 psig.

The pressure reached the range of 15 to 20 psig and was maintained in this range during the first 2½ hours by venting as necessary.

The white copolyamide thus produced had a polymer-melt temperature of 225°C. and an inherent viscosity of 0.56, determined in dichloroacetic acid as in Example I. The copolyamide exhibited the normal melting endotherm at its crystalline melting point of 234°C and an additional crystalline melting endotherm at 185°C., indicating the polymer to have a block structure.

EXAMPLE VI

To an unstirred glass reactor were charged 3.7250 grams (12 millimoles) of the salt (pH 6.6) of 1,8-octanediamine and terephthalic acid, 1.8420 grams (8 millimoles) of dodecanedioic acid, and 1.1540 grams (8 millimoles) of 1,8-octanediamine. The mixture was then heated in the following manner under a nitrogen atmosphere at an initial pressure of 10 psig.

| Time, minutes | Temperature, °C. | Comments |
| --- | --- | --- |
| 30 | 150–210 | heated at an at least substantially uniform rate. |
| 180 | 210 | temperature maintained at least substantially constant. |
| 30 | 210–320 | heated at an at least substantially uniform rate. |
| 30 | 320 | temperature maintained at least substantially constant. |
| 30 | 320 | nitrogen flush. |
| 30 | 320 | 30 mm Hg. |

The pressure reached the range of 15 to 20 psig and was maintained in this range during the first 4½ hours by venting as necessary.

The resulting white copolyamide had a polymer-melt temperature of 260°C. and an inherent viscosity of 1.54, determined at 30°C. in a m-cresol solution having a polymer concentration of 0.5 gram per 100 milliliters solution. The copolyamide exhibited the normal melting endotherm at its crystalline melting point of 290°C.

and a very small, broad crystalline melting endotherm at 186°C., indicating the polymer to have a block structure.

EXAMPLE VII

To an unstirred glass reactor were charged 3.7251 grams (12 millimoles) of the salt (pH 6.6) of 1,8-octanediamine and terephthalic acid, 1.3941 grams (8 millimoles) of suberic acid, and 1.1543 grams (8 millimoles) of 1,8-octanediamine. The mixture was then heated in the following manner under a nitrogen atmosphere at an initial pressure of 10 psig.

| Time, minutes | Temperature, °C. | Comments |
|---|---|---|
| 30 | 150–210 | heated at an at least substantially uniform rate. |
| 180 | 210 | temperature maintained at least substantially constant. |
| 30 | 210–320 | heated at an at least substantially uniform rate. |
| 30 | 320 | temperature maintained at least substantially constant. |
| 30 | 320 | nitrogen flush. |
| 30 | 320 | 30 mm Hg. |

The pressure reached the range of 15 to 20 psig and was maintained in this range during the first 4½ hours by venting as necessary.

The resulting cream colored copolyamide had a polymer-melt temperature of 260°C. and an inherent viscosity of 0.52, determined in dichloroacetic acid as in Example I. The copolyamide exhibited the normal melting endotherm at its crystalline melting point of 285°C. and a very small crystalline melting endotherm at 189°C., indicating the polymer to have a block structure.

Reasonable variations and modifications are possible within the scope of the foregoing disclosure and the appended claims to the invention.

I claim:

1. A copolyamide suitable for use as a molding resin and consisting essentially of the polymeric condensation product of terephthalic acid, dodecanedioic acid, and 1,12-dodecanediamine, the terephthalic acid constituting from about 50 to about 90 mole percent of the acids, said copolyamide having a tensile strength of at least 7,000 psi when measured in accordance with ASTM D 638–68.

2. A copolyamide in accordance with claim 1 wherein said terephthalic acid constitutes from about 60 to about 85 mole percent of the acids.

3. A copolyamide in accordance with claim 2 wherein said copolyamide has a percent elongation of at least 40 when measured in accordance with ASTM D 638–68, a flexural modulus of at least 250,000 psi when measured in accordance with ASTM D 790–66 and an Izod impact strength of at least 0.5 ft.-lb./in. notch when measured in accordance with ASTM D 256–56.

4. A copolyamide in accordance with claim 3 wherein said terephthalic acid constitutes about 80 mole percent of the acids.

5. A copolyamide in accordance with claim 2 wherein said copolyamide is at least substantially white in color.

6. A copolyamide in accordance with claim 2 wherein said copolyamide is derived from a mixture of 1,12-dodecanediamine, dodecanedioic acid, and the salt of 1,12-dodecanediamine and terephthalic acid.

7. A copolyamide in accordance with claim 6 wherein said mixture contains about 1 mole percent acetic acid.

8. A copolyamide in accordance with claim 2 wherein said copolyamide has a tensile strength of at least 7,500 psi when measured in accordance with ASTM D 638–68, a percent elongation of at least 50 when measured in accordance with ASTM D 638–68, a flexural modulus of at least 300,000 psi when measured in accordance with ASTM D 790–66 and an Izod impact strength of at least 0.6 ft.-lb./in. notch when measured in accordance with ASTM D 256–56.

* * * * *